United States Patent [19]

Riley

[11] Patent Number: 4,467,559

[45] Date of Patent: Aug. 28, 1984

[54] CHIP BUDDING MACHINE

[75] Inventor: Terry W. Riley, Adelaide, Australia

[73] Assignee: Techsearch, Inc., Adelaide, Australia

[21] Appl. No.: 433,553

[22] Filed: Oct. 8, 1982

[30] Foreign Application Priority Data

Oct. 8, 1981 [AU] Australia ............................ PF1109

[51] Int. Cl.³ .......................................... A01G 1/00
[52] U.S. Cl. ..................................................... 47/7
[58] Field of Search ................... 47/1, 6, 7; 100/230, 100/233, 234, 243, 281, 283, 285, 286, 293; 81/302, 347, 350, 355.1

[56] References Cited

U.S. PATENT DOCUMENTS

| 645,922 | 3/1900 | Stelzl | 47/7 |
| 2,553,463 | 5/1951 | McCulloch | 47/1 X |
| 2,914,976 | 12/1959 | Demler | 81/355 X |

FOREIGN PATENT DOCUMENTS

| 14172 | of 1920 | Australia | 47/7 |
| 526612 | 10/1921 | France | 47/6 |
| 530542 | 12/1921 | France | 47/6 |
| 704648 | 5/1931 | France | 47/7 |
| 998909 | 1/1952 | France | 47/6 |
| 2293138 | 8/1976 | France | 47/6 |
| 256 | 6/1880 | Italy | 47/6 |
| 250017 | 8/1947 | Switzerland | 47/6 |
| 22327 | of 1901 | United Kingdom | 47/6 |
| 2075812 | 11/1981 | United Kingdom | 47/6 |
| 48108 | 8/1981 | U.S.S.R. | 47/6 |

Primary Examiner—James R. Feyrer
Attorney, Agent, or Firm—Brown & Martin

[57] ABSTRACT

One block is movable with respect to another block, one of the blocks having a clamp which clamps the scion or root stock, and the other having knives facing the clamp, and in a configuration to remove a dovetail chip from both the scion and root stock so that the chip from the scion when inserted in the root stock recess exactly matches the recess, and the two cambia align accurately.

8 Claims, 5 Drawing Figures

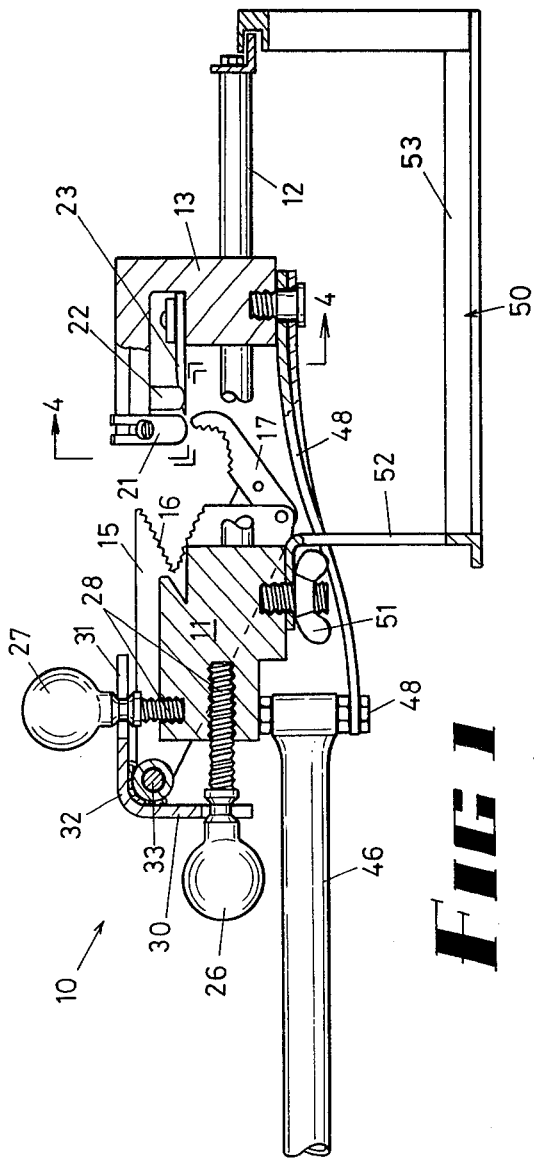
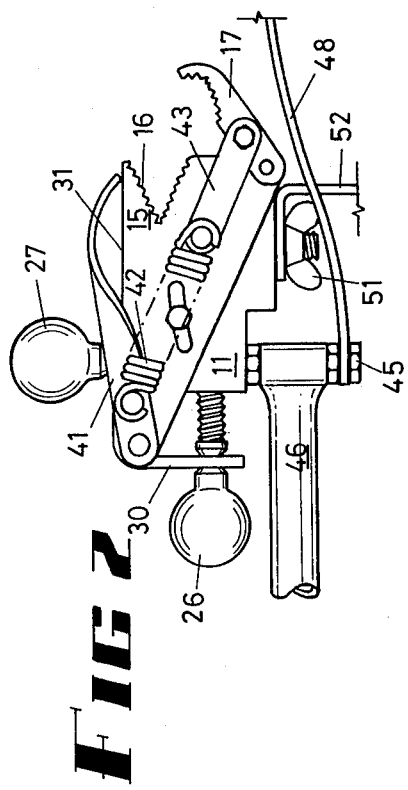

CHIP BUDDING MACHINE

This invention relates to an implement which is useful for effecting the horticultural process preparation for the insertion of a chip bud into a wine, ornamental, or fruit tree, root stock or the like.

BACKGROUND OF THE INVENTION

Chip budding implements have been proposed heretofore, and although certain claims have been made, tests have indicated that many of those implements are not particularly suitable for preparation of both chip buds and root stocks for the chip budding process, since they are essentially of an awkward design. When a chip bud is to be inserted into a vine, fruit tree, root stock or the like, it is necessary for the cambium of the scion to align with the cambium of the root stock which is being used for an effective union to be made. The use of root stock is increasing rapidly because of absence of viability when using inappropriate root stocks, or the roots of a varietal plant, and for example in the wine industry it is deemed most necessary to use nematode and phylloxera resistant root stocks in order to get sufficient production from the vines, especially in replant situations. Low production vines are not economically viable.

This problem has been recognised, and notwithstanding the existence of certain chip budding implements, hand budding has been widely used, but the success rate varies with the skill of the operator and is so uncertain that there is a probability that the cambium of scion and root stock do not align and as a result the success rate of hand chip budding can be as low as 20%.

One object of this invention is to provide a hand held implement which can effectively be used in the field as well as at a fixed bench site.

A further object is to provide an implement which can be used for preparation of chip bud from a scion, and root stock, prior to a chip budding process.

BRIEF SUMMARY OF THE INVENTION

Briefly, in this invention one block is movable with respect to another block, one of the blocks having a clamp which clamps the scion or root stock, and the other having knives facing the clamp, and in a configuration to remove a dovetail chip from both the scion and root stock so that the chip from the scion when inserted in the root stock recess exactly matches the recess, and the two cambia align accurately.

More specifically, the invention consists of a mounting block, a clamp on the mounting block of shape suitable for clamping a cane of a plant, a knife block having a plurality of knives arranged in a dovetail configuration facing the clamp, guide means coupling the blocks for relative movement in a direction towards or away from one another, and motion imparting means linking the blocks for effecting said relative movement.

The method in this invention is to remove a chip bud from a scion cane or stick of desired varietal type, the chip bud having a dovetail shape in longitudinal section, engage the implement over a cane or stick of root stock and operate the implement to firstly clamp root stock and subsequently remove a chip therefrom having the same longitudinal sectional size and shape as the chip bud, and then insert the chip bud into the dovetail shape recess of the root stock.

In one embodiment of the invention, the implement is provided with a clamp block which opens upon operation of handles, the implement receiving alternatively a scion stick or root stock by holding it with the handles, and by closing the handles together or operating the mechanism firstly the scion (or root stock) is firmly gripped by the clamp block, and subsequently knives of the knife block cut a recess of complementary shape in the root stock to the shape of a scion chip bud previously cut with the same implement. This ensures an alignment of the cambia, and the implement can be used for a wide range of plants in the horticultural field. It can be used for example not merely on vines, but also on pome fruit, stone fruit, ornamentals, nut trees and other growing plants.

BRIEF SUMMARY OF THE DRAWINGS

An embodiment of the invention is described hereunder with reference to and is illustrated in the accompanying drawings, in which FIG. 1 is a central longitudinal section through a chip budding implement, FIG. 2 is a fragmentary side elevation, drawn to an enlarged scale, and showing the clamp arrangement.

DETAILED DESCRIPTION OF THE PREFERRED EMBODIMENT

Figure 3:
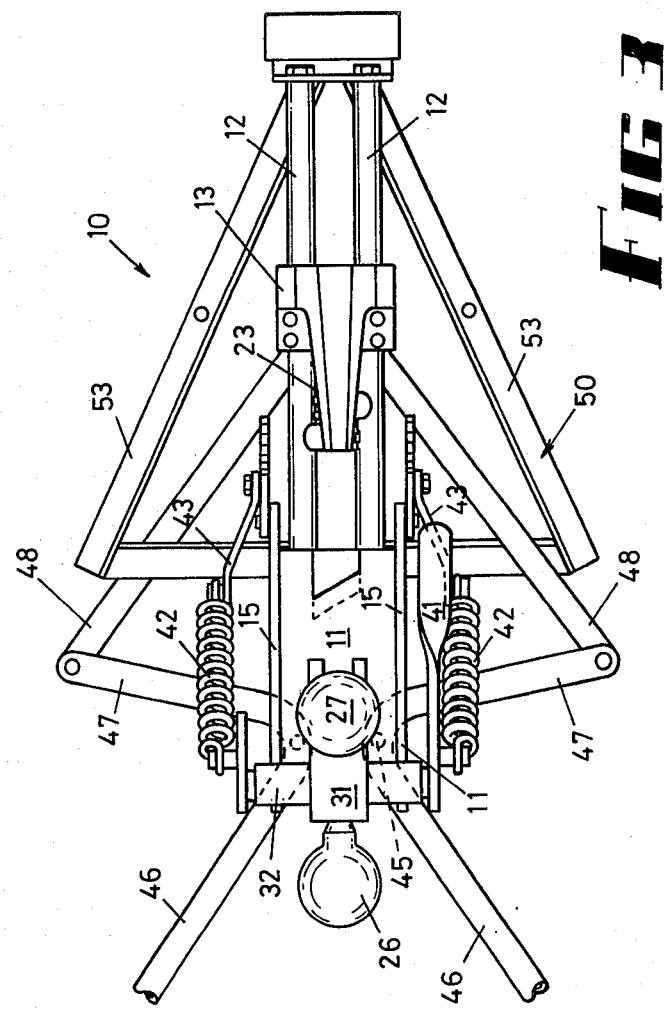
FIG. 3 is a plan of the implement.

In this embodiment an implement 10 for effecting grafting of chip buds into the root stock of a vine or fruit tree comprises a mounting block 11 having a pair of spaced guide members 12 (or a single guide member) extending in one direction. The guide members 12 are slidably engaged by a knife block 13, and between the knife block 13 and the mounting block 12, but attached to block 12, are located a pair of clamp plates 15 each with a "V" shaped serrated surface 16, and clamp fingers 17 co-operable therewith, for clamping a scion 18, or a root stock (not shown).

Figure 5:
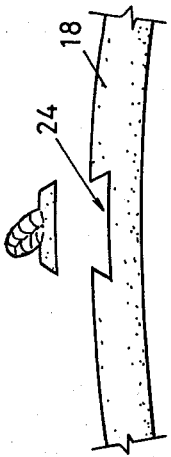
FIG. 5 is a fragmentary view of a scion cane of a grape vine, indicating the removal of the chip bud therefrom by the implement of this invention.

The knife block 13 comprises a pair of knives 21 and 22 which are inclined with respect to one another so that they lie in respective planes which cross, and there is also provided a horizontal knife blade 23 which lies symmetrically between the two sloping knives 21 and 22 in the knife block 13, and the three knives are so sharpened that when driven through a cane, the symmetrical knife block cuts the bottom of a dovetail shaped recess 24 (FIG. 5) and the two sloping knife blocks cut the side edges. The depth of cut is achieved by means of varying the location of the clamp plates 15 with respect to the mounting block 11, and this is achieved by an end screw knob 26 and an upper screw knob 27, each with a respective screw 28 which threadably engages mounting block 11. These knobs 26 and 27 engage respective arms 30 and 31 which extend at right angles to a carrier 32 which carries the clamp plates 15, and can operate both to move clamp plates 15 towards or away from knife block 13, and rock the plates 15 (on their spindle 33), with respect to carrier 32, thereby giving all the required adjustment for location of the scion 18 with respect to knife block 13.

Figure 4:
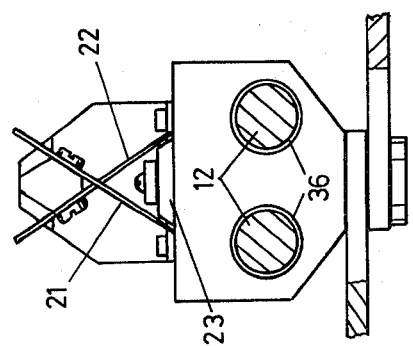
FIG. 4 is a section taken on line 4—4 of FIG. 1 (drawn to an enlarged scale)

As shown in FIG. 4, the guide members 12 are slidably engaged by bushes 36 in knife block 13 for guiding the knife block in its movement towards or away from mounting block 11.

Clamping of a scion 18 against serrated surfaces 16 is effected by an "over-centre" clamping lever 41 (FIG. 2), connected by springs 42 and links 43 to the clamp fingers 17.

There are provided two pivot pins 45 for pivotting the respective handles 46 with respect to the mounting block 11, the handles 46 each being "L" shaped in plan as shown in FIG. 3, having respective arms 47 which are connected by links 48 to the knife block 13, constituting motion imparting means which link blocks 11 and 13 for relative movement. Clearly the handles may be pivotted to block 13 and linked to block 11, if desired.

In alternative constructions, an hydraulically, electrically or pneumatically operated system can be used in place of the above described handles.

While preparation of root stock must frequently be effected in the field, separation of the chip buds themselves can conveniently be a bench operation. There is provided a mounting frame 50 which supports the mounting block 11 and the free ends of the guide members 12, but the implement can be released therefrom by release of locking nut 51.

In use, a plurality of chip buds are first cut from scions by mounting the implement on mounting frame 50, the mounting frame 50 having a support stem 52 at the front end, and a triangular base 53 which remains bolted to a bench.

After a plurality of dovetail shaped chip buds have been thus cut, they are then taken with the implement, removed from its mounting, into the field, and the canes or root stocks are similarly cut to provide slots being of identical longitudinal sectional shape to the chip buds, and the chip buds are inserted into respective slots. Since the shapes are identical, the cambia align and thereby a high success rate is capable of being achieved. The joint is covered with grafting tape, mastic or other material.

Consideration of the above embodiment will indicate that the invention is particularly simple, but it makes possible easy and accurate grafting of chip buds both onto root stock and onto growing branches or vines.

I claim:

1. A chip budding implement comprising a mounting block, a clamp, means securing the clamp to the mounting block, said clamp comprising at least one clamp plate, at least one clamp finger pivoted with respect to the clamp plate, a clamping lever also pivoted with respect to the clamp plate, and a spring coupling the clamping lever to the clamp finger, the clamp plate and clamp finger being a shape suitable for clamping a cane of a plant and the spring being operable to effect said clamping upon movement of the lever,
   a knife block having a plurality of knives arranged in a dovetail configuration facing the clamp,
   guide means coupling the blocks for relative movement in a direction towards or away from one another, and
   motion imparting means linking the blocks for effecting said relative movement.

2. A chip budding implement according to claim 1 wherein said guide means extend from the mounting block, and are slidably engaged by the knife block.

3. A chip budding implement according to claim 1, wherein said clamp comprises a pair of clamp plates and an adjustment member between the clamp plates and the mounting block which adjust the position of the clamp plates with respect to the knives.

4. A chip budding implement comprising a mounting block, a clamp on the mounting block of a shape suitable for clamping a cane of a plant, a knife block having a plurality of knives arranged in a dovetail configuration facing the clamp, guide means extending from the mounting block and slidably engaged by the knife block, and at least one handle linking the knife block to the mounting block for effecting slidable movement of the knife block over the guide means, and wherein said clamp comprises a carrier, a pair of spaced parallel clamp members secured to the carrier and extending towards the knife block, a pair of adjustment members, each adjustment member comprising a screw threadably engaging the mounting block, one said adjustment member having its longitudinal axis parallel to the guide means and thereby being operable to move the clamp members towards or away from the knife block, the other adjustment member having its longitudinal axis at right angles to the guide means and thereby being operable to move the clamp members in a direction at right angles to the guide means.

5. A chip budding element according to claim 4 including a pair of handles, pivot means pivoting each respective handle to the mounting block, and respective links coupling the handles to the knife block.

6. A chip budding implement comprising a mounting block, a knife block having a plurality of knives arranged in a dovetail configuration facing the mounting block, a pair of guides extending from the mounting block slidably engaged by the knife block guiding the knife block for movement in a direction towards or away from the mounting block, a pair of handles, pivot means pivotally connecting each respective said handle to said mounting block, said link means coupling each respective said handle to the knife block, so arranged that movement of the handles effects corresponding said movement of the knife block,
   a clamp comprising a carrier, a pair of spaced clamp plates on the carrier, surfaces defining a clamping recess in each clamp plate, and a pair of clamping fingers carried by respective said clamping plates and movable between a clamping position and a release position, and means for releasably retaining the clamping fingers in said clamping position.

7. A chip budding implement according to claim 6 wherein said means for releasably retaining the clamping fingers in said clamping position comprise a clamping lever, pivot means connecting the clamping lever to the carrier, and springs coupling the clamping lever to the clamp fingers.

8. A chip budding implement according to claim 5 further comprising a mounting frame, and means releasably retaining the support block to the mounting frame.

* * * * *